United States Patent
Tsuchiya et al.

(10) Patent No.: US 7,403,876 B2
(45) Date of Patent: Jul. 22, 2008

(54) WIRE HARNESS WIRING PATH DESIGN AIDING APPARATUS AND METHOD, WIRE HARNESS WIRING PATH DESIGN AIDING PROGRAM AND MEDIUM STORING THE PROGRAM

(75) Inventors: Shinji Tsuchiya, Kosai (JP); Kohki Nagakura, Kosai (JP); Takeshi Hasegawa, Kosai (JP)

(73) Assignee: Yazaki Corporation, Tokyo (JP)

( * ) Notice: Subject to any disclaimer, the term of this patent is extended or adjusted under 35 U.S.C. 154(b) by 595 days.

(21) Appl. No.: 10/703,422

(22) Filed: Nov. 10, 2003

(65) Prior Publication Data

US 2004/0230403 A1    Nov. 18, 2004

(30) Foreign Application Priority Data

Nov. 8, 2002  (JP)  ............................ P2002-325534
Sep. 5, 2003  (JP)  ............................ P2003-314296

(51) Int. Cl.
    *G06F 17/50* (2006.01)
(52) U.S. Cl. ............................................. 703/1; 716/5
(58) Field of Classification Search .................... 703/1; 716/5
    See application file for complete search history.

(56) References Cited

U.S. PATENT DOCUMENTS 6,457,165 B1 * 9/2002 Ishikawa et al. ............... 716/12
6,791,336 B2 * 9/2004 Krigel ......................... 324/539
6,842,173 B2 * 1/2005 Sakakura et al. ............. 345/419
6,845,553 B2 * 1/2005 Akizuki et al. ................. 29/749
6,961,683 B2 * 11/2005 Kodama et al. ................. 703/2
7,026,723 B2 * 4/2006 Moreno ......................... 290/55
7,107,197 B1 * 9/2006 Shropshire .................... 703/13

FOREIGN PATENT DOCUMENTS

JP    2001-250438 A    9/2001
JP    2001-251740 A    9/2001
JP    2001-251741 A    9/2001

OTHER PUBLICATIONS

Bruno Agard, 2002, teaches a Design of Wire Harness for mass customization, pp. 1-10.*
Grierson et al., 1992, teaches a n Application of Artificial Intelligence in Engineering VII, p. 355-372.*

(Continued)

*Primary Examiner*—Paul L Rodriguez
*Assistant Examiner*—Andre Pierre Louis
(74) *Attorney, Agent, or Firm*—Sughrue Mion, PLLC

(57) ABSTRACT

A wire harness wiring path design aiding apparatus and method. The apparatus includes a device for storing data of a minimum bending radius of the wire harness and a device for checking if the designed wiring path is valid by comparing wire harness wiring path data with the minimum bending radius data. If it is determined that the designed wiring path does not meet minimum the bending radius requirement, the CAD system outputs data representative of a corrected wiring path taking the minimum bending radius data into consideration.

7 Claims, 4 Drawing Sheets

OTHER PUBLICATIONS

Irving Dlugath, IEEE 1967, teaches The applicability of computer aided design as a system engineering tool.*

Alibozek T:, "Smart Software Builds a Better Harness", Machine Design, Penton Media, Cleveland, OH, US, vol. 70, No. 8, May 7, 1998, pp. 89-92, XP001092826.

Wu Y et al:, "Use of the Expert System as a Design Tool for the Cable Harness Design", Applications of Artificial Intelligence in Engineering. Proceedings of the International Conference, Jul. 14, 1992, pp. 357-372, XP008042313.

* cited by examiner

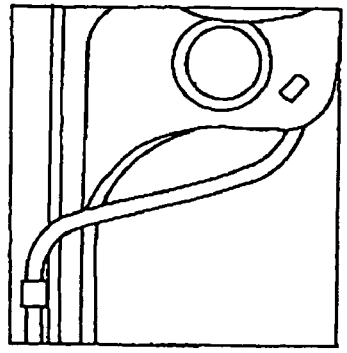

FIG. 3A — INSPECT MINIMUM BENDING RADIUS WITH RESPECT TO DESIGNED WIRING PATH

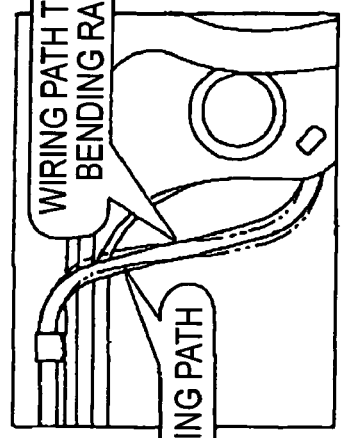

FIG. 3B — EXTRACT ERROR PART AND DISPLAY WIRING PATH TO WHICH MINIMUM BENDING RADIUS IS APPLIED
- WIRING PATH TO WHICH MINIMUM BENDING RADIUS IS APPLIED
- ERROR WIRING PATH

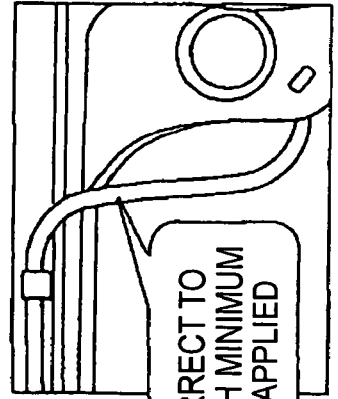

FIG. 3C — CHECK WHETHER WIRING PATH SHOULD BE CORRECT WITH TAKING MINIMUM BENDING RADIUS INTO CONSIDERATION, AND AUTOMATICALLY CORRECT IT
- AUTOMATICALLY CORRECT TO WIRING PATH TO WHICH MINIMUM BENDING RADIUS IS APPLIED

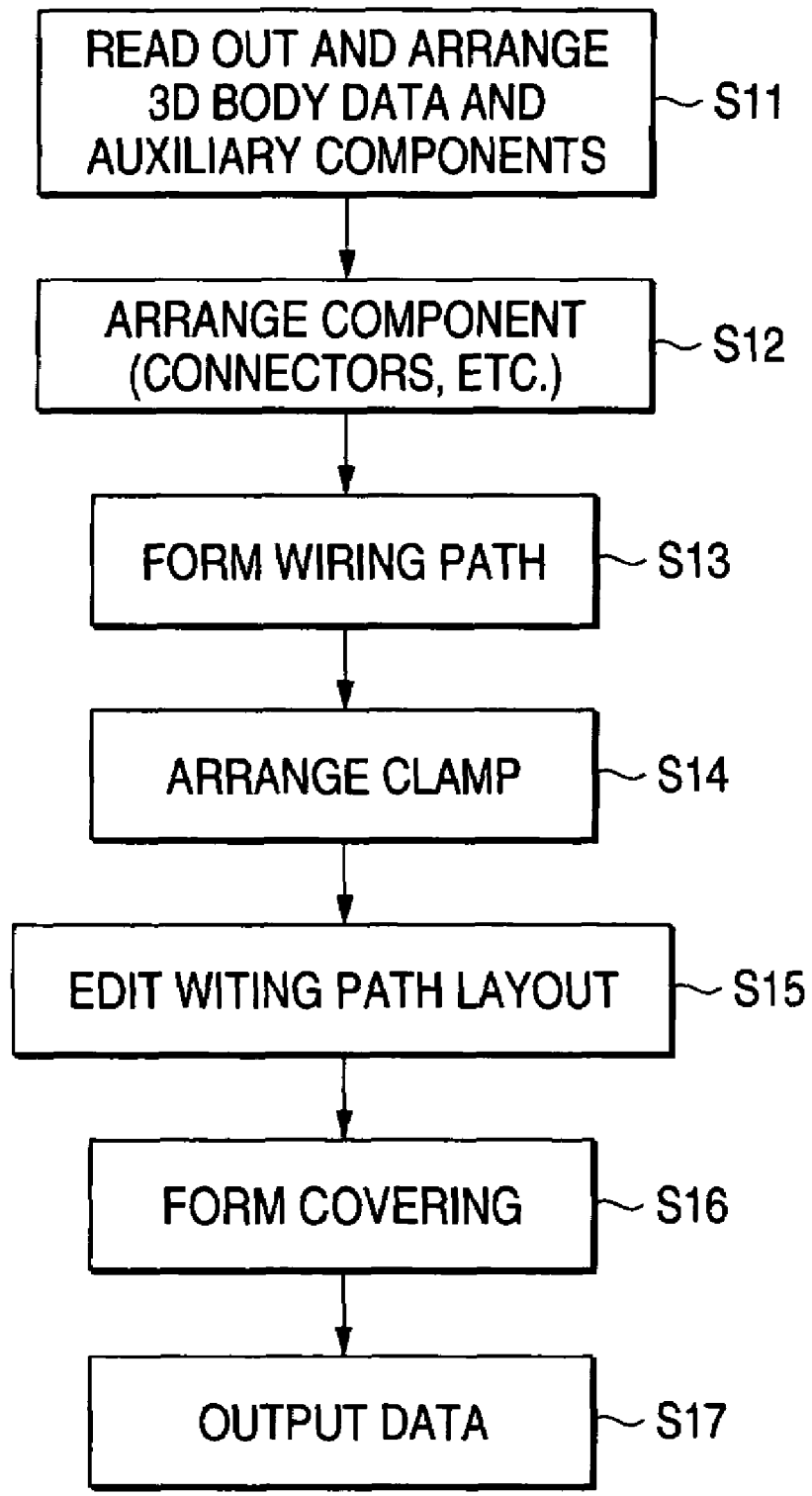

WIRE HARNESS WIRING PATH DESIGN AIDING APPARATUS AND METHOD, WIRE HARNESS WIRING PATH DESIGN AIDING PROGRAM AND MEDIUM STORING THE PROGRAM

The present invention relates to an apparatus and method for aiding a design of wiring paths of wire harnesses in a three-dimensional space. More particularly, the invention relates to an apparatus and method for aiding a design of wiring paths of wire harnesses in a three-dimensional space, which is made while taking into consideration a minimum bending radius of the wire harness which varies depending on a type and the number of wires to be bundled into a wire harness, and a type of the covering of the wire harness, and a wire harness wiring path design aiding program, and a computer-readable medium storing the program.

A wire harness design aiding apparatus described below is known (for example, JP-A-2001-250438).

The patent document provides an object to provide an apparatus and method for assisting wiring design, which computes a practical configuration of a wire harness by using simple setting items, and computer readable storage medium.

Further, the patent document discloses "A wire harness wiring design assisting apparatus having computing means for computing a wiring configuration of a wire harness, which satisfies a plurality of fixing positions of said wire harness which are input, by using the fixing positions and a deformation factor of the wire harness, and for providing information on the computation result, wherein the computing means computes a bending rigid E of a target wire harness by a prescribed biquadratic function of a curvature p of the wire harness based on a diameter φ of the wire harness, and computes a wiring configuration of the wire harness by using the computed bending rigid E."

In electronic appliances installed in vehicles such as automobiles, and in home-use electronic appliances, a wire combined member, called a wire harness, is used for connecting one electric device to another electric device or one package to another package.

As the wire combined member, there is a wire harness which is constituted by a bundle of a number of electric wires or communication wires, which is covered with a protecting member, such as a tape, and in which connectors are attached to both ends of the wire harness.

A CAD (computer aided design) system is used in designing wiring paths of the wire harness.

Design of the wire harness wiring paths by use of the CAD system will be described below by using a flow chart shown in FIG. 4.

3-dimensional (3D) data of a body (vehicle body) of the automobile as an object on which the wire harness is installed and 3D data of auxiliary devices including electric devices installed on the vehicle body are input to the CAD system in advance.

To design the wire harness wiring paths, a computer of the CAD system reads out necessary data; displays a portion of the vehicle body on which the wire harness wiring paths are to be installed on a display screen according to an instruction of an operator; and three-dimensionally displays a layout of the auxiliary components including electric devices on the vehicle body portion on the screen (step 11).

Connectors for connecting the wire harness are placed at necessary positions of the auxiliary components on the screen.

And, grommets are formed at the through parts of the vehicle body (step S12).

The wire harness is disposed between the connectors placed in the step S12 to form a wire harness wiring path (step S13).

In installing the wire harness, a main path and a branch path (branch wiring path) of the wire harness are distinctively traced.

The wire harness wiring path installed in the step S13 is fastened at the mid position to the vehicle body by means of a clamp (step S14).

The clamping prevents the wire harness from interfering with the vehicle body.

The layout of the wire harness wiring path is edited so as to prevent the wire harness wiring path installed in the steps S13 and S14 from interfering with the auxiliary components located near the wiring path (step S15).

A covering (tape, tube, sheet, or the like) is applied to the wire harness in order to protect the electric wires contained in the wire harness (step S16).

The CAD data thus formed is output (step S17).

The output data may be used in another system when it is transferred to the latter.

The design procedure as described above is employed in the conventional wire harness path design work using the CAD system. The wire harness paths may be easily designed by using the 3D (3-dimensional) data of a body of the automobile as an object on which the wire harness is installed and 3D (3-dimensional) data of auxiliary devices (electric devices and others) installed on the vehicle body, which the data are input to the CAD system in advance. In this respect, the conventional design procedure is meritorious. In the conventional design, the step S13, viz., to install the wire harness between the two points to form a wiring path, is executed based on the empirically rule, for example, securing of the shortest distance. This wiring path design procedure is not suitable for the design of wiring paths of various types of wire harnesses.

The thickness and the minimum bending radius of the wire harness vary depending on the type and the number of electric wires bundled into the wire harness. A type of the covering of the wire harness also determines the minimum bending radius of the wire harness. For this reason, it frequently occurs that the wire harness installation data formed by the CAD system has no use for practical stage.

SUMMARY OF THE INVENTION

An object of the present invention is to provide a CAD system which is capable of realizing a design of wiring paths of wire harnesses, which is made taking into consideration a minimum bending radius of the wire harness which varies depending on a type and the number of wires to be bundled into a wire harness, and a type of the covering of the wire harness.

In order to solve the aforesaid object, the invention is characterized by having the following arrangement.

(1) A wire harness wiring path design aiding apparatus comprising:

a designing unit which designs a wiring path of a wire harness by using body data on an object to which the wire harness is installed and three-dimensional data on an auxiliary device installed on a vehicle body;

a storing unit which stores data on a minimum bending radius of the wire harness; and a checking unit which judges whether the wiring path data designed by the designing unit satisfies the minimum bending radius, and outputs, if the wiring path data does not satisfy the minimum bending radius, data on corrected wiring path data designed in light of the minimum bending radius.

(2) The apparatus according to (1), wherein the storing unit stores, as the data on the minimum bending radius, a first minimum bending radius defined based on properties of material of the wire harness and a second minimum bending radius defined based on force of worker's hand, and wherein the apparatus includes a selecting unit which, when the first minimum bending radius differs from the second minimum bending radius, selects one of the first and second minimum bending radii which has larger minimum bending radius.

(3) The apparatus according to (1), wherein the data on the corrected wiring path data includes a plurality of wiring paths which are sequentially output.

(4) The apparatus according to (1), wherein the data on the minimum bending radius includes data on plural pieces of minimum bending radius depending on a type and a number of wires to be bundled into the wire harness and a type of covering of the wire harness.

(5) A wire harness design aiding method comprising the steps of:

storing body data on an object to which a wire harness is installed, three-dimensional data on an auxiliary device installed on a vehicle body, and data on a minimum bending radius of the wire harness;

calculating the wiring path extending between predetermined two points based on the body data and three-dimensional data;

outputting data on the calculated wiring path of the wire harness;

comparing the wiring path with the minimum bending radius; and outputting, if the wiring path does not satisfy the minimum bending radius, data on corrected wiring path data designed in light of the data on the minimum bending radius.

(6) The method according to (5), wherein as the data on the minimum bending radius, a first minimum bending radius defined based on properties of material of the wire harness and a second minimum bending radius defined based on force of worker's hand are stored, and wherein when the first minimum bending radius differs from the second minimum bending radius, one of the first and second minimum bending radii which has larger minimum bending radius is selected.

(7) The method according to (5), wherein the storing step stores plural pieces of minimum bending radius data depending on a type and a number of wires to be bundled into the wire harness and a type of covering of the wire harness.

(8) A computer readable recording medium which stores a program for causing a computer to function as a wire harness wiring path design aiding apparatus executing the steps of:

reading out body data on an object to which the wire harness is installed, three-dimensional data on an auxiliary device installed on a vehicle body and data on a minimum bending radius of the wire harness;

calculating the wiring path of the wiring path extending between predetermined two points based on the body data and three-dimensional data;

outputting data on the calculated wiring path of the wire harness;

comparing the wiring path with the minimum bending radius; and outputting, if the wiring path does not satisfy the minimum bending radius, data on corrected wiring path data designed in light of the data on the minimum bending radius.

(9) The computer readable recording medium according to (8), wherein as the data on the minimum bending radius, a first minimum bending radius defined based on properties of material of the wire harness and a second minimum bending radius defined based on force of worker's hand are read out, and wherein when the first minimum bending radius differs from the second minimum bending radius, one of the first and second minimum bending radii which has larger minimum bending radius is selected.

(10) The computer readable recording medium according to (8), wherein a determination is made whether the corrected wiring path interferes with the body, and when it is determined that the corrected wiring path interferes with the body, the calculating step is executed.

BRIEF DESCRIPTION OF THE DRAWINGS

FIGS. 3 and 3C are diagrams showing images on a display screen of the CAD system constructed according to the invention.

FIG. 4 is a flow chart showing a conventional procedure of designing wiring paths of wire harnesses by using a CAD system.

DETAILED DESCRIPTION OF PREFERRED EMBODIMENTS

Figure 1:
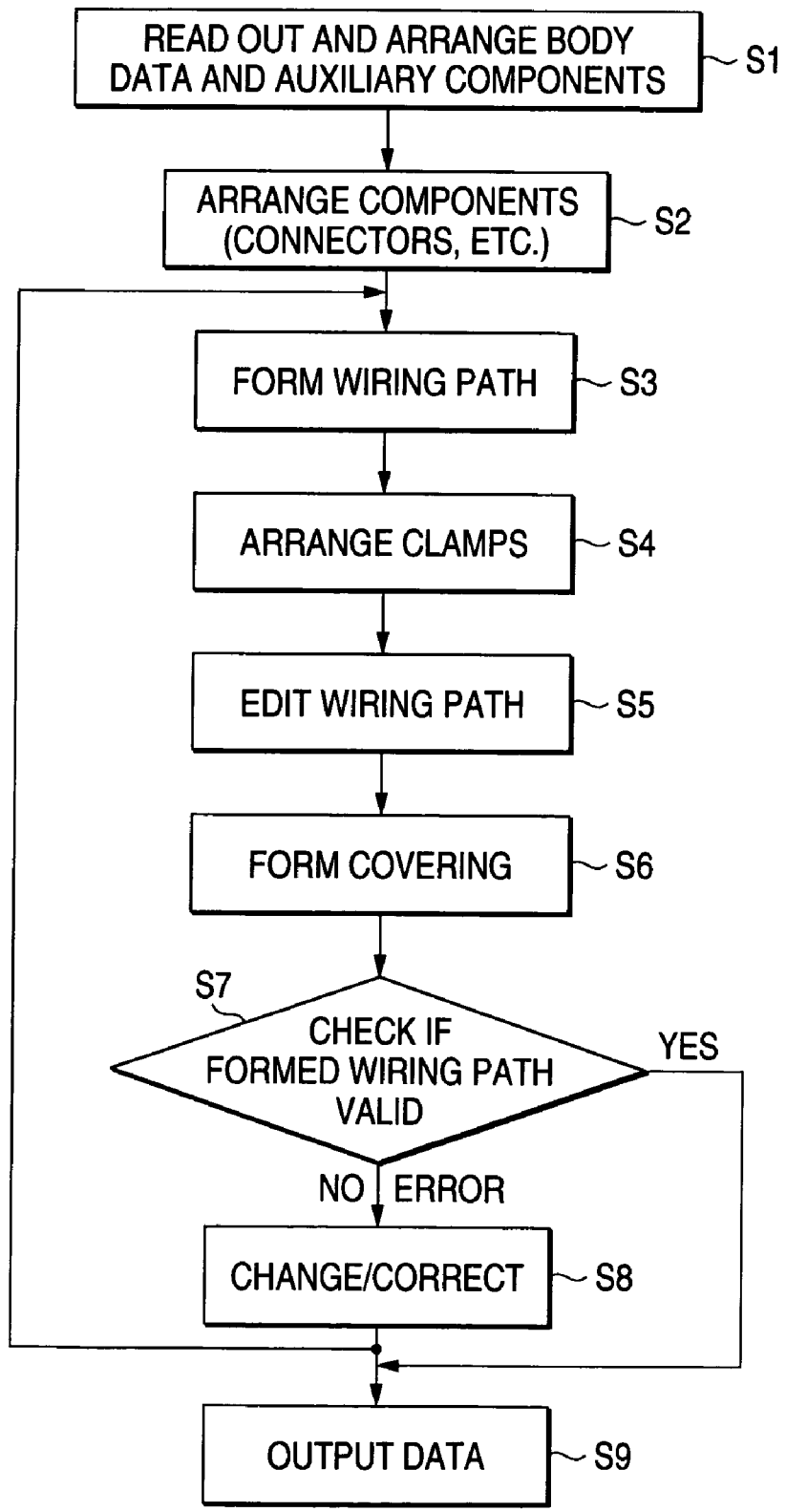
FIG. 1 is a flow chart showing a basic procedure of designing wiring paths of wire harnesses by using a CAD system, which is an implementation of the present invention.

A basic design procedure executed in a computer of a CAD system according to the present invention will be exemplarily described by using a flow chart of FIG. 1.

3-dimensional (3D) data of a body (vehicle body) of the automobile as an object on which the wire harness is installed, 3D data of auxiliary devices including electric devices installed on the vehicle body, and the minimum bending radius data of wire harnesses having various different specifications on the type and the number of wires to be bundled into the wire harness, and the type of the covering of the wire harness are stored into a memory of the CAD system in advance.

The term, "bending radius" in the specification means a radius of a virtual circle formed by a wire harness when it is bent. A minimum bending radius of the wire harness is categorized into (1) a first minimum bending radius R(1) defined based on the properties of the wire harness and (2) a second minimum bending radius R(2) defined based on forces by the worker's hands.

The first minimum bending radius R(1) defined based on the properties of the wire harness is a minimum bending radius of the wire harness which allows the wire harness to bend in a state that the original functions of the wire harness are retained without rupture or fracture of the wires of the wire harness and deterioration of the insulation covers of the wires.

The second minimum bending radius R(2) defined based on forces by the worker's hands is a minimum bending radius defined based on the upper limits of the forces, e.g., bending and twisting forces, applied by the worker's hands when the wire harness is attached to the vehicle body.

When the first minimum bending radius R(1) is not equal to the second minimum bending radius R(2), it is preferable to use the minimum bending radius which is the larger of the two.

One of the differences of the CAD system of the invention from the conventional CAD system is that the minimum bending radius data of the wire harnesses of various different specifications are entered to the CAD system in advance.

To design the wire harness wiring paths, a computer of the CAD system reads out necessary data from a storing part; displays a portion of the vehicle body on which the wire harness wiring paths are to be installed on a display screen according to an instruction of an operator; and three-dimensionally displays a layout of the auxiliary components including the electric devices on the vehicle body portion on the screen (step S1).

Connectors for connecting the wire harness are placed at necessary positions of the auxiliary components on the screen.

Grommets are formed at through parts of the vehicle body (step S2).

The wire harness is installed between the connectors placed in the step S12 to form a wire harness wiring path (step S3).

At this time, a main path and a branch path (branch wiring path) of the wire harness are distinctively designed.

The wire harness wiring path created in the step S13 is fastened at the mid position to the vehicle body by means of a clamp (step S4).

The clamp and the connector may be of the type in which the fixing parts of the wire harness are each rotatable or not rotatable, and other suitable types of them may be used.

Further, the grommet and the clamp are used for preventing such an unwanted situation that the wire harness shifts under vibrations or the like to interfere with the vehicle body.

A layout of the wire harness wiring path is edited so as to prevent the wire harness wiring path installed in the steps S3 and S4 from interfering with the auxiliary components located near the wiring path (step S5).

Those steps S3 to S5 thus ordered in execution may be executed in another order, if required, and are substantially concurrently executed.

A covering (tape, tube, sheet, or the like) is applied to the wire harness in order to protect the electric wires contained in the wire harness (step S6).

The design procedure from the steps S1 to S6 is substantially the same as the conventional design procedure (steps S11 to S17).

In the invention, the computer checks if the wring path is valid when it is evaluated taking into consideration the minimum bending radius of the wire harness extending along the designed wiring path (step S7).

In checking the wiring path validity, the following checks may also be made: to check if the installed wire harness interferes with the vehicle body and/or the auxiliary components located near the wire harness and to check other manufacturing requirements.

The manufacturing requirement check contains the following items:

Are a clamp or clamps located at a position within a predetermined distance measured from the branched part?

Is a clamp-to-clamp distance within a predetermined distance?

Is a distance between the adjacent branching parts secured larger than a predetermined distance?

Is the number of branching parts selected within a predetermined number of branching parts when possible?

The computer compares pre-stored data representing the pre-stored minimum bending radius data of the wire harness having various different specifications on the type and the number of wires to be bundled into the wire harness and the type of the covering of the wire harness, with the bending radius of the wire harness extending along the designed wiring path.

If the answer is YES (the bending radius of the wire harness extending along the designed wiring path is larger than the minimum bending radius:), the formed CAD data is output (step S9).

If the answer is NO (one or some bending radii of the bending parts of the wire harness displayed on the screen are (each) smaller than the minimum bending radius of the wire harness stored in the CAD system), the computer advances to one of the steps S8 or S3. In the step S8, the computer automatically corrects the designed or formed wiring path into a wiring path which is formed with taking into consideration the minimum bending radius, which is determined by the type and the number of wires to be bundled into the wire harness and the type of the covering of the wire harness, and then the computer advances to a step S9. Otherwise, the computer returned to the step S3. In the step 3, another new wiring path is formed by changing the position of the clamp, and the computer checks if the wiring path formed anew is valid when it is re-evaluated with taking the minimum bending radius into consideration.

As described above, in the design of the wire harness wiring path by using the CAD system according to the invention, the designer can design a wiring path of a wire harness, while taking the minimum bending radius of the wire harness into consideration. Therefore, it never occurs that the wire harness installation data formed by the CAD system has no use for practical stage.

Figure 2A:
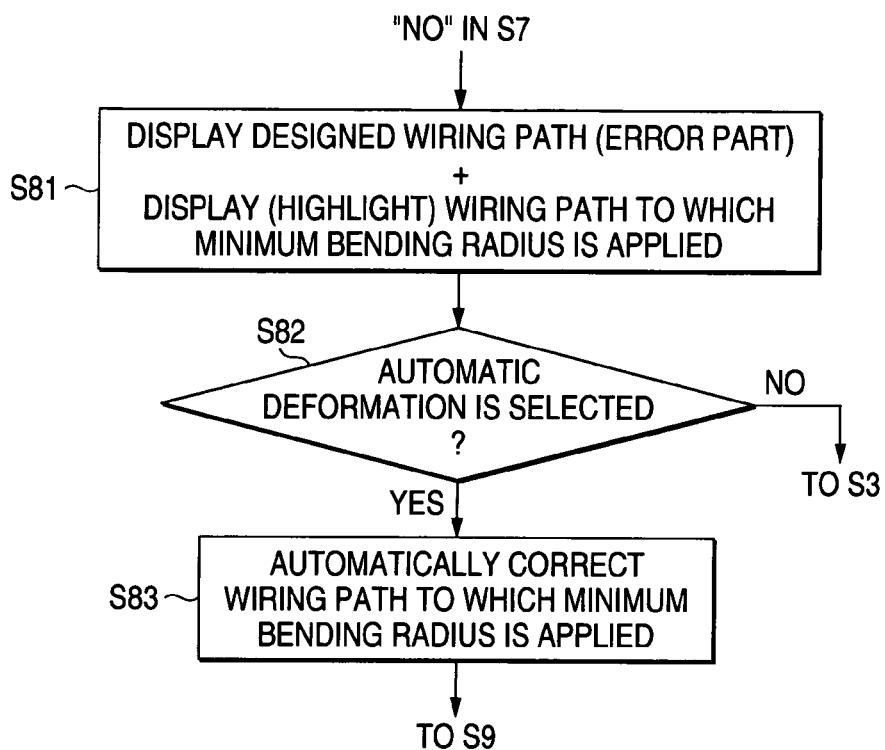
FIGS. 2A and 2B are diagrams useful in explaining the detail of a step of checking if the designed wring path is valid when it is evaluated taking into consideration the minimum bending radius of the wire harness extending along the designed wiring path.

The process (step S8) of the design procedure, which is executed when the answer is NO in the determination in step S7 in FIG. 1 whether the formed wiring path is valid while taking into consideration the minimum bending radius, will be described in detail with reference to FIGS. 2A and 2B.

First, the computer compares the minimum bending radius of the wire harness extending along the formed wiring path with the pre-stored data of the minimum bending radius of the wire harness.

Figure 2B:
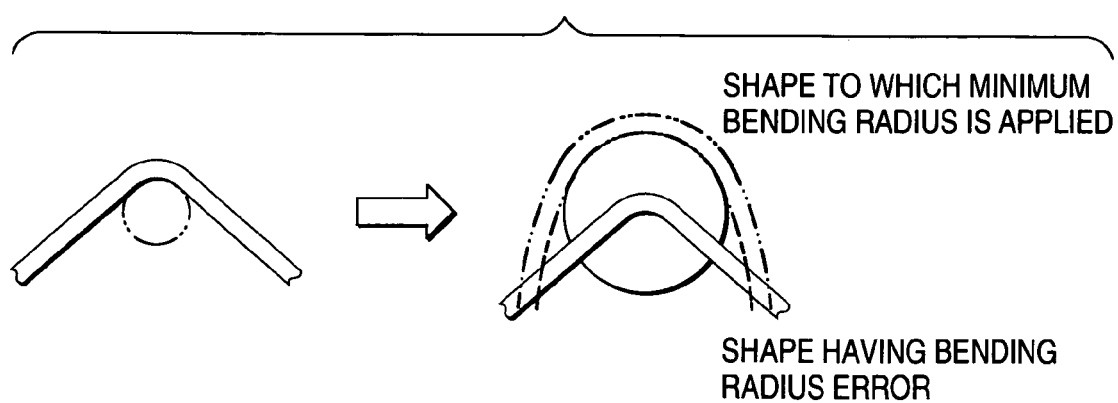

A wiring path designed taking the pre-stored data of the minimum bending radius of the wire harness into consideration is displayed as shown in FIG. 2B (step S81).

FIG. 2B shows an error pattern of a curved part of the wire harness when the bending radius of the wire harness is smaller than the minimum bending radius of the wire harness pre-stored in the CAD system, and a pattern of the curved part, which is formed designed with taking the data of the minimum bending radius of the wire harness into consideration, in an overlapping fashion.

In the next step (step S82), the computer judges if the formed wiring path is to be automatically corrected into a wiring path designed taking the data of the minimum bending radius into consideration.

Specifically, the judgment as to if the designed wiring path is to be automatically corrected into a wiring path designed taking the data of the minimum bending radius into consideration is executed by judging whether a pattern of the wiring path designed with taking the data of the minimum bending radius into consideration interferes with the vehicle body (data).

If the answer is NO (the automatic correction is not carried out), the step S3 is executed in which the designer forms another new wiring path by shifting the clamp or clamps to another or other positions.

If the answer is YES (the automatic correction is carried out), the computer automatically corrects the wiring path to a wiring path designed to which the data of the minimum bending radius of the related part of the wire harness pre-stored is reflected, and advances to the step S9 (step S83).

Images showing a design process of altering (correcting) a designed wiring path into a wiring path designed taking into consideration the minimum bending radius of the wire harness according to the invention will be described with reference to FIG. 3.

FIGS. 3A to 3C show three-dimensional images of a portion of a vehicle body and a wire harness, which are displayed on the display screen of the CAD system.

FIG. 3A shows a state in which a wiring path of the wire harness has been designed by use of the CAD system, and the wire harness has been fixed to the vehicle body, and preparation is made for inspecting the minimum bending radius of the wire harness.

FIG. 3B shows a state displaying, as the results of inspecting the minimum bending radius, the originally designed wiring path (error wiring path whose bending radius does not meet the minimum bending radius requirement), and a wiring path whose bending radius meets the minimum bending radius requirement.

FIG. 3C shows the state that the wiring path not meeting the minimum bending radius requirement has been corrected so as to meet the minimum bending radius requirement as the results of the execution of the auto correction by the CAD system.

The wire harness wiring path design aiding apparatus and method, and the wire harness wiring path design aiding program, and the computer-readable medium storing the program are capable of realizing a design of wiring paths of wire harnesses, which is made with taking into consideration a minimum bending radius of the wire harness which varies depending on a type and the number of wires to be bundled into a wire harness, and a type of the covering of the wire harness. In this respect, the invention is excellent in its industrial applicability.

What is claimed is:

1. A wire harness wiring path design aiding apparatus comprising:
    a designing unit which designs a wiring path of a wire harness by using body data on an object to which the wire harness is installed and three-dimensional data on an auxiliary device installed on a vehicle body;
    a storing unit which stores data on a minimum bending radius of the wire harness; and
    a checking unit which judges whether the wiring path data designed by the designing unit satisfies the minimum bending radius, and outputs, if the wiring path data does not satisfy the minimum bending radius, data on corrected wiring path data designed in light of the minimum bending radius,
    wherein the storing unit stores, as the data on the minimum bending radius, a first minimum bending radius defined based on properties of material of the wire harness and a second minimum bending radius defined based on force of worker's hand, and
    wherein the apparatus includes a selecting unit which, when the first minimum bending radius differs from the second minimum bending radius, selects one of the first and second minimum bending radii which has larger minimum bending radius.

2. The apparatus according to claim 1, wherein the data on the corrected wiring path data includes a plurality of wiring paths which are sequentially output.

3. The apparatus according to claim 1, wherein the data on the minimum bending radius includes data on plural pieces of minimum bending radius depending on a type and a number of wires to be bundled into the wire harness and a type of covering of the wire harness.

4. A wire harness design aiding method comprising the steps of:
    storing body data on an object to which a wire harness is installed, three-dimensional data on an auxiliary device installed on a vehicle body, and data on a minimum bending radius of the wire harness;
    calculating the wiring path extending between predetermined two points based on the body data and three-dimensional data;
    outputting data on the calculated wiring path of the wire harness;
    comparing the wiring path with the minimum bending radius; and
    outputting, if the wiring path does not satisfy the minimum bending radius, data on corrected wiring path data designed in light of the data on the minimum bending radius,
    wherein as the data on the minimum bending radius, a first minimum bending radius defined based on properties of material of the wire harness and a second minimum bending radius defined based on force of worker's hand are stored, and
    wherein when the first minimum bending radius differs from the second minimum bending radius, one of the first and second minimum bending radii which has larger minimum bending radius is selected.

5. The method according to claim 4, wherein
    the storing step stores plural pieces of minimum bending radius data depending on a type and a number of wires to be bundled into the wire harness and a type of covering of the wire harness.

6. A computer readable recording medium which stores a program for causing a computer to function as a wire harness wiring path design aiding apparatus executing the steps of:
    reading out body data on an object to which the wire harness is installed, three-dimensional data on an auxiliary device installed on a vehicle body and data on a minimum bending radius of the wire harness;
    calculating the wiring path of the wiring path extending between predetermined two points based on the body data and three-dimensional data;
    outputting data on the calculated wiring path of the wire harness;
    comparing the wiring path with the minimum bending radius; and
    outputting, if the wiring path does not satisfy the minimum bending radius, data on corrected wiring path data designed in light of the data on the minimum bending radius,
    wherein as the data on the minimum bending radius, a first minimum bending radius defined based on properties of material of the wire harness and a second minimum bending radius defined based on force of worker's hand are read out, and wherein when the first minimum bending radius differs from the second minimum bending radius, one of the first and second minimum bending radii which has larger minimum bending radius is selected.

7. The computer readable recording medium according to claim 6, wherein a determination is made whether the corrected wiring path interferes with the body, and when it is determined that the corrected wiring path interferes with the body, the calculating step is executed.

* * * * *